No. 862,150. PATENTED AUG. 6, 1907.
C. FREDRICKS.
FISH HOOK BAIT HOLDER.
APPLICATION FILED MAY 21, 1906.

Witnesses
Edward G. Royland
Gustav E. Pellnitz

Inventor
Charles Fredricks

UNITED STATES PATENT OFFICE.

CHARLES FREDRICKS, OF NEW YORK, N. Y.

FISH-HOOK BAIT-HOLDER.

No. 862,150.

Specification of Letters Patent.

Patented Aug. 6, 1907.

Application filed May 21, 1906. Serial No. 318,093.

*To all whom it may concern:*

Be it known that I, CHARLES FREDRICKS, a citizen of the United States, and a resident of 69 Stanhope street, borough of Brooklyn, city and State of New York, engaged in business at 842 Broadway, same borough, have invented a new and useful Improvement in Fish-Hook Bait-Holders; and I do hereby declare that the following is a full, clear, and exact description of the same.

My invention relates in general to fishhook bait holders, and in particular to improvements therein, designed to permit the freedom of motion of all parts of the body of live bait, the use of soft bait, the use of several live baits at one time, and the use of extraordinary large live bait, hard or soft; all without pinching, puncturing, impaling, clasping, gripping or in any manner depreciating the value of the bait, by injury.

To this end my invention consists of certain novel features of construction and combination of parts herein after fully described and particularly pointed out in the claim.

Reference is to be had to the accompanying drawings, forming part of the specification, in which the same numbers designate corresponding parts in all figures.

Figure 1:
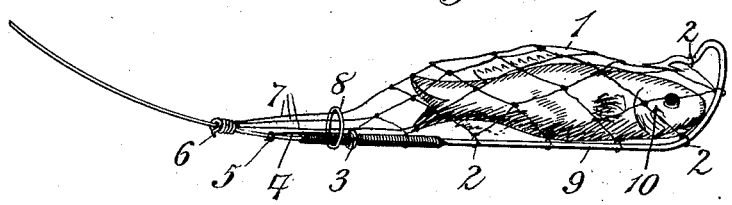
Figure 2:
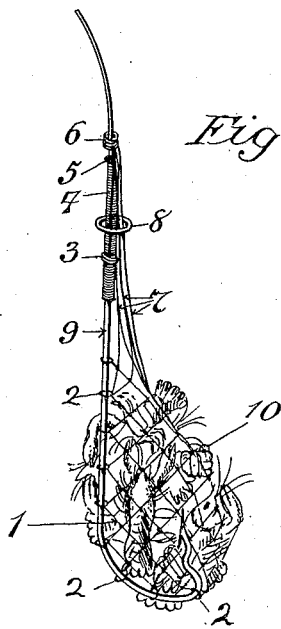
Figure 4:
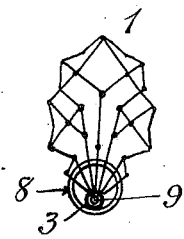
Figure 3:
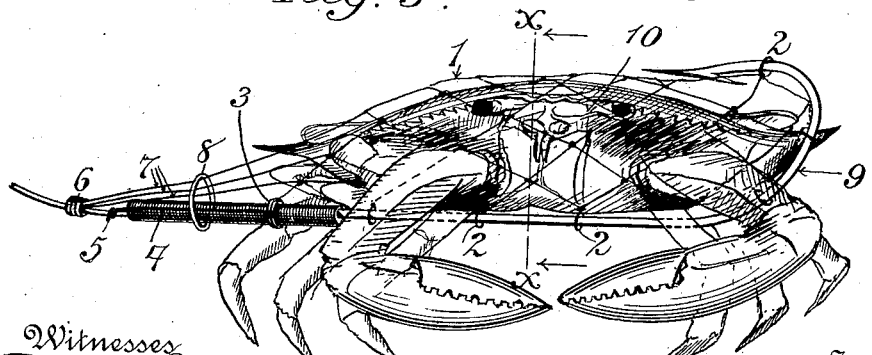

Figures 1, 2 and 3 are side views of bait holders, embodying my invention. Fig. 4 is a cross section x to x.

In the drawings 1 is a bait holder, receptacle, inclosure, bag or pocket, which can be made of almost any material not dissolvable in water, but preferably of twine netting, because of its transparency, flexibility, elasticity and uniform and regular openings or mesh.

Numbers 2 are movable exterior loops of the pocket, designed to attach the hook 9 to the pocket and hold it normally in its proper position with reference to the pocket, Figs. 1, 2 and 3; and are also designed to readily pass along the hook 9, toward the snelled or ringed end of the shank of the hook, when a fish is hooked.

4 is a cord, one end fastened to movable exterior loop 3 and the other attached to that part 5 of the fish-hook gut immediately above the shank of the hook and is designed to prevent movable loop 3 from passing down the shank of the hook below any fixed point.

7 are cords, joining parts of the material forming the mouth of the pocket, with that part of the fish-hook gut above the shank of the hook, formed into a knot 6 at the upper ends, and are designed to aid in opening and closing the mouth of the pocket, also to aid in holding the pocket in its proper position: Figs. 1, 2 and 3.

A small ring or rubber band 8 passing around the shank of the hook, the cords 7 and the cord 4 and through which the material of the pocket at its mouth can be drawn, is designed to close the mouth of the pocket.

9 is a fish hook.

10 is live bait wholly or partially inclosed in the pocket, 1 held loosely yet securely, so as to obtain the bait's highest degree of value, by permitting a single live bait to walk, Fig. 3, or swim, Figs. 1 and 3, about in a natural manner, and by permitting numbers of small live baits to intertwine with themselves and the material of the pocket, forming a cluster, Fig. 2.

To bait the hook, pass the ring 8 along the fish-hook gut in the direction away from the point of the hook; bend the fish-hook gut in the direction of the point of the hook; then pass the knot 6 along the gut in the same direction, thus opening the mouth of the pocket; insert the bait and close the mouth of the pocket by returning the knot 6 to its normal position, Figs. 1, 2 and 3, and pass the closing ring or band to its normal position: Figs. 1, 2 and 3.

Two or more fish-hooks are used with one pocket, by increasing the number of movable exterior loops of the pocket 1. The clustering of small baits, while tending to conceal the hooks and bait pocket, also induces a fish to widely open its mouth. The pocket prevents soft bait, such as oysters and mussels, from being washed away from the hook by the action of the waves, tide and current. A large pocket permits the use of an entire live soft crab, Fig. 3. All live bait is kept alive in the most valuable condition. The greatest force and violence necessary to cast baited fish-hooks the longest possible distances, will not disengage the bait from the hook.

It is obvious that any flexible pocket allowing the bait to be seen and constructed to permit circulation of water through the pocket and around the bait will produce some of the novel results accomplished by the specific form of pocket herein illustrated, and will be within this invention, and therefore in claiming an "open work" pocket I am not to be limited to a net.

Having thus fully described my invention and the manner in which I carry the same into practice, I claim as new and desire to secure by Letters Patent—

1. The combination of a fish hook with a flexible pocket attached thereto and a ring for closing the open end of said pocket, substantially as described.

2. The combination of a fish hook with a flexible open work pocket attached to the shank thereof, and a ring for closing the open end of said pocket, substantially as described.

3. The combination of a fish hook with a flexible pocket attached to the shank thereof by means of loops adapted to slide on the hook, substantially as described.

4. The combination of a fish hook with a flexible pocket attached to the shank thereof and a cord attaching the upper end of said pocket to the hook so as to prevent the pocket sliding down towards the point, substantially as described.

In testimony whereof I have hereunto set my hand the 16th day of May, 1906.

CHARLES FREDRICKS.

In presence of—
 VALENTINE J. RIEDMAN,
 JOHN BISSELL.